J. GARRARD.
HARVESTER-RAKE.

No. 179,010.  Patented June 20, 1876.

Witnesses.
Chas. J. Gooch
Le Blond Burdett

Inventor.
Jeptha Garrard
By Knight Bros
his Attorneys

UNITED STATES PATENT OFFICE.

JEPTHA GARRARD, OF CINCINNATI, OHIO, ASSIGNOR TO EXCELSIOR GRAIN-BINDER COMPANY, (LIMITED,) OF NEW YORK, N. Y.

IMPROVEMENT IN HARVESTER-RAKES.

Specification forming part of Letters Patent No. 179,010, dated June 20, 1876; application filed April 10, 1876.

*To all whom it may concern:*

Be it known that I, JEPTHA GARRARD, of Cincinnati, in the county of Hamilton and State of Ohio, have invented a new and useful Improvement in Devices for Raking Grain Preparatory to Binding, of which the following is a specification:

It is the object of this invention to close up the gavel while it is passing along the grain-platform, and into the binder-platform, so that from the moment the rake begins to move the grain across the grain-platform the gavel is continuously closing. The device for doing this I call a gaveler, and consists of one or more arms pivoted at a point so far back that the arc of the circle described in working shall not reach beyond the line of the falling grain.

The device is made with a double arm when it is to be used with short grain.

Figure 1:
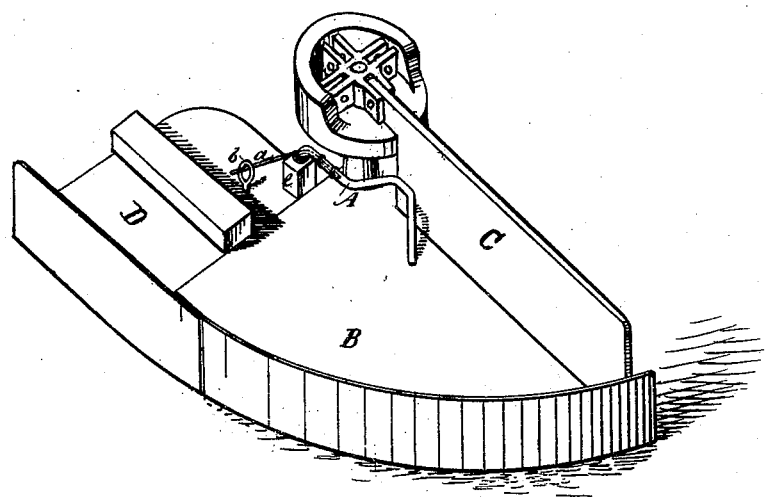
Figures 2, 3:
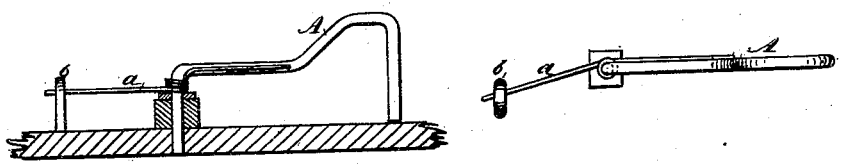
Figure 4:
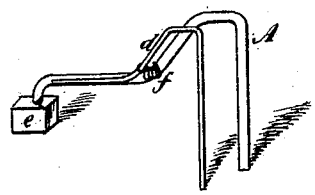

In the accompanying drawing, Figure 1 is a perspective view of the combination of a sector raking-platform, an arm of a smooth-surfaced sweep-raking device, a binder-platform, and the gaveler. Fig. 2 is a side elevation of a gaveler. Fig. 3 is a top view of the same. Fig. 4 is a perspective view of a gaveler with additional arm.

B represents the sector raking-platform; C, the smooth-surface or toothless raking device; and D, the binder-platform. A is the gaveler; $a$ is the spring which returns the gaveler to the first position; $b$ is the spring fastening on binder-platform; $e$ is a stud or socket for pivoting the gaveler; $d$ is an additional arm on gaveler; and $f$ is a spring on additional arm.

The operation is as follows: The rake, in passing over the grain-platform, strikes the gaveler, and in advancing moves it through the arc of a circle, and, when the rake rises to leave the grain-platform, the gaveler is thrown back to its first position, actuated by a spring or other device. A spring is shown in the model. The gaveler pushes the butts along the smooth-surfaced or toothless raking device, toward the outer end of same until the said rake rises and leaves the grain-platform.

The walls of the binder-platform in this combination may converge or not, as convenience may dictate.

The gaveler may have an additional arm or resistance-pin, as shown in drawing, and lettered $d$. The function of this additional arm or pin is to prevent the inturning of the heads of short grain before reaching the binder-platform.

It is not essential to the invention that the gaveler shall be driven by the contact of the raking device, as herein described and shown. If preferred, it may be worked by gearing or other mechanism, timed with the rake, and its backward stroke may be positive and gradual instead of instantaneous under the action of a spring, as in the present illustration. The right is reserved to cover, by a separate application, the mechanism employed for operating the gaveler independently of the raking device.

Having thus described my invention, the following is what I claim as new, and desire to secure by Letters Patent:

1. The combination of a smooth-surfaced raking device and a gavel-closer, moving with said raking device, substantially as shown.

2. The combination of a sweep-raking device, a sector raking-platform, and a gavel-closer, A, substantially as shown.

3. The combination of a sweep-raking device, a sector-shaped raking-platform, a binder-platform, and a gavel-closer, substantially as shown.

4. The gaveler A, constructed with one or more arms, to operate substantially as and for the purposes set forth.

JEPTHA GARRARD.

Witnesses:
 WM. BURNET, Jr.,
 OCTAVIUS KNIGHT.